(12) United States Patent
Arnabat Benedicto et al.

(10) Patent No.: US 10,313,558 B2
(45) Date of Patent: Jun. 4, 2019

(54) DETERMINING IMAGE RESCALE FACTORS

(71) Applicant: Hewlett-Packard Development Company, L.P., Houston, TX (US)

(72) Inventors: Jordi Arnabat Benedicto, L'Arboc del Penedes (ES); Alessia Rullo, Sant Cugat del Valles (ES); Jordi Vilar Benito, Castelldefels (ES); Jesus De La Lama Pesquera, Rubi (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/105,285

(22) PCT Filed: Dec. 20, 2013

(86) PCT No.: PCT/US2013/076808
§ 371 (c)(1),
(2) Date: Jun. 16, 2016

(87) PCT Pub. No.: WO2015/094321
PCT Pub. Date: Jun. 25, 2015

(65) Prior Publication Data
US 2017/0006184 A1    Jan. 5, 2017

(51) Int. Cl.
*H04N 1/393*    (2006.01)
*H04N 1/00*    (2006.01)

(52) U.S. Cl.
CPC ........... *H04N 1/393* (2013.01); *H04N 1/0044* (2013.01); *H04N 1/00411* (2013.01); *H04N 1/00461* (2013.01); *H04N 2201/0094* (2013.01)

(58) Field of Classification Search
CPC .. H04N 1/393; H04N 1/00411; H04N 1/0044; H04N 1/00461; H04N 2201/0094
See application file for complete search history.

(56) References Cited

U.S. PATENT DOCUMENTS

| | | | |
|---|---|---|---|
| 2007/0008355 A1 | 1/2007 | Miyamoto et al. | |
| 2007/0273895 A1 | 11/2007 | Cudd et al. | |

(Continued)

FOREIGN PATENT DOCUMENTS

| | | | |
|---|---|---|---|
| JP | 05002589 A | * | 1/1993 |
| KR | 20090009087 A | | 2/2009 |

(Continued)

OTHER PUBLICATIONS

David Watson, "AutoCad Tutorial: AutoCAD to Photoshop," CadTutor, Feb. 22, 2007, <http://web.archive.org/web/20070222092908/http://www.cadtutor.net/tutorials/autocad/au 12 pages.

(Continued)

*Primary Examiner* — Iriana Cruz
(74) *Attorney, Agent, or Firm* — HP Inc. Patent Department (57) ABSTRACT

In one example of the disclosure, a print job with instructions for printing an image at a resolution is obtained. A display of the image, at the resolution, at a display device is caused. A first reference and a second reference are indicated within the displayed image. A quantity of pixels between the first and second references is determined. An indication of a real distance between the first and second references is received. A desired scale for the image is obtained. A rescale factor for the image is determined based on the resolution, the determined pixel quantity, the real distance, and the desired scale.

18 Claims, 6 Drawing Sheets

(56) References Cited

U.S. PATENT DOCUMENTS

| | | |
|---|---|---|
| 2008/0030818 A1 | 2/2008 | Nagahara et al. |
| 2008/0187245 A1 | 8/2008 | Habets et al. |
| 2009/0009511 A1 | 1/2009 | Ueda et al. |
| 2010/0002246 A1 | 1/2010 | Ozaki et al. |
| 2010/0134594 A1 | 6/2010 | Xuan |
| 2011/0075200 A1 | 3/2011 | Goldwater et al. |
| 2012/0140279 A1* | 6/2012 | Takasaki ............ H04N 1/00411 358/1.15 |
| 2012/0182569 A1 | 7/2012 | Lee |
| 2012/0229847 A1 | 9/2012 | Muramatsu |
| 2013/0163049 A1* | 6/2013 | Kirihata ................ G06K 15/02 358/1.15 |
| 2014/0218409 A1* | 8/2014 | Kawatani ................ G06T 11/00 345/670 |

FOREIGN PATENT DOCUMENTS

| | | |
|---|---|---|
| WO | 2007021467 A2 | 2/2007 |
| WO | 2011141291 A1 | 11/2011 |
| WO | WO-2013046759 | 4/2013 |

OTHER PUBLICATIONS

Printing System Workflow and User Interface, (Web Page), 2002. ~ 1 page.
Watson, David. AutoCAD to Photoshop. Oct. 22, 2013. CAD Tutor. ~ 12 pages.

* cited by examiner

DETERMINING IMAGE RESCALE FACTORS

BACKGROUND

Digital reprography can be described as the reproduction of drawings, illustrations and other images through digital imaging, scanning, and/or printing. Print provider businesses commonly use digital reprography processes to meet standard-format, large-format, and wide-format reproduction needs of the architectural, engineering, and construction industries. Items produced for such customers may include plans, blueprints, renderings, maps, and other technical documents.

DETAILED DESCRIPTION

Introduction:

A print provider may receive print jobs containing technical drawings in a file formats such as PDF, TIFF, HPGL2, or DWG. The provider may receive as part of the job print instructions specifying a media size and a prescribed or desired scale for printed drawings.

Proper scaling of a printed technical drawing can be critical for the print provider's architect, engineer, and construction industry customers. Such customers need to be able to take measurements upon the printed drawing, and use such measurements to accurately calculate distances between elements in the drawing. Such accurate measurements are necessary for the customer to correctly engineer or construct the finished item that is the subject of the drawings. If a drawing is printed out of scale in comparison to the prescribed scale, there can be serious consequences to the customer in terms of wasted time, wasted materials, and damage to the customer's brand as a result of faultily manufactured products.

Notwithstanding that the print job includes a prescribed scale, print providers will sometimes experience situations wherein printing according to the prescribed scale would result in a printout that is out-of-scale vis a vis the intended scale. One common cause for the error is that the drawings that are the subject of the print job were digitally scanned with a scanning device that erroneously caused the drawing file to be at a resolution that is different than the resolution of the original scanned drawings. Another common cause for such a scaling error is that, a resolution or scale instructions that are included in an image file were generated incorrectly as a result of an error in software that was used to render the document to a printer-ready format such as PCL3, PCL5, or PostScript. In another example, the prescribed scale included in the print job may be inaccurate due to a software application having created an incorrect resolution tag (e.g., a TIFF tag) or other indication of scale that is included in the image fife or otherwise included within the print job.

Typically detecting and fixing image files with incorrect scaling information as described above has involved a print provider manually taking measurements on a printout of the image after the job has printed, and manually calculating an adjustment that when applied to the image will cause a subsequent printout of the image to be at the prescribed scale. Such an approach can be a tedious task for the print provider, and the associated materials and labor costs often ultimately borne by the customer.

To address these issues, various embodiments described in more detail below provide for a system and a method to determining image rescale factors. In an example of the disclosure, a print job, with instructions for printing an image at a prescribed resolution, is obtained. A display of the image, at the prescribed resolution, is caused at a display device. A first reference and a second reference are indicated or designated within the displayed image. A quantity of pixels between the first and second references is determined. An indication of a real distance between the first and second references is received. A desired scale for the image is obtained. A rescale factor for the image is determined upon the resolution, the determined pixel quantity, the real distance, and the desired scale. The rescale factor can be applied to rescale the image such that a printing or display of the rescaled image will result in an adjusted image that is correctly scaled as compared to the desired scale.

In this manner, embodiments of this disclosure present an automated and efficient manner determine a rescale factor for out of scale images, and apply the rescale factor to enable printing of the image at the corrected resolution. Using the newly disclosed method and system it is possible for a print-provider to utilize a user-guided estimation of the scale of a technical drawing before printing, and thereby automatically identify out-of-scale situations and automatically fix the scale-print-setting of the page in order to create a correct print out. Print providers will not be required to manually compute adjustment factors and explicitly reset document print scales to accomplish correct printing. Accordingly, users will benefit from sayings in materials and time. Such advantages of the disclosure will cause customer satisfaction with digital printing of technical drawings, and the applications, and computing devices that facilitate the digital printing, to increase.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of determining image rescale factors using record-relevancy tiers. The fourth section, labeled as "Operation," describes steps taken to implement various embodiments.

Figure 1:
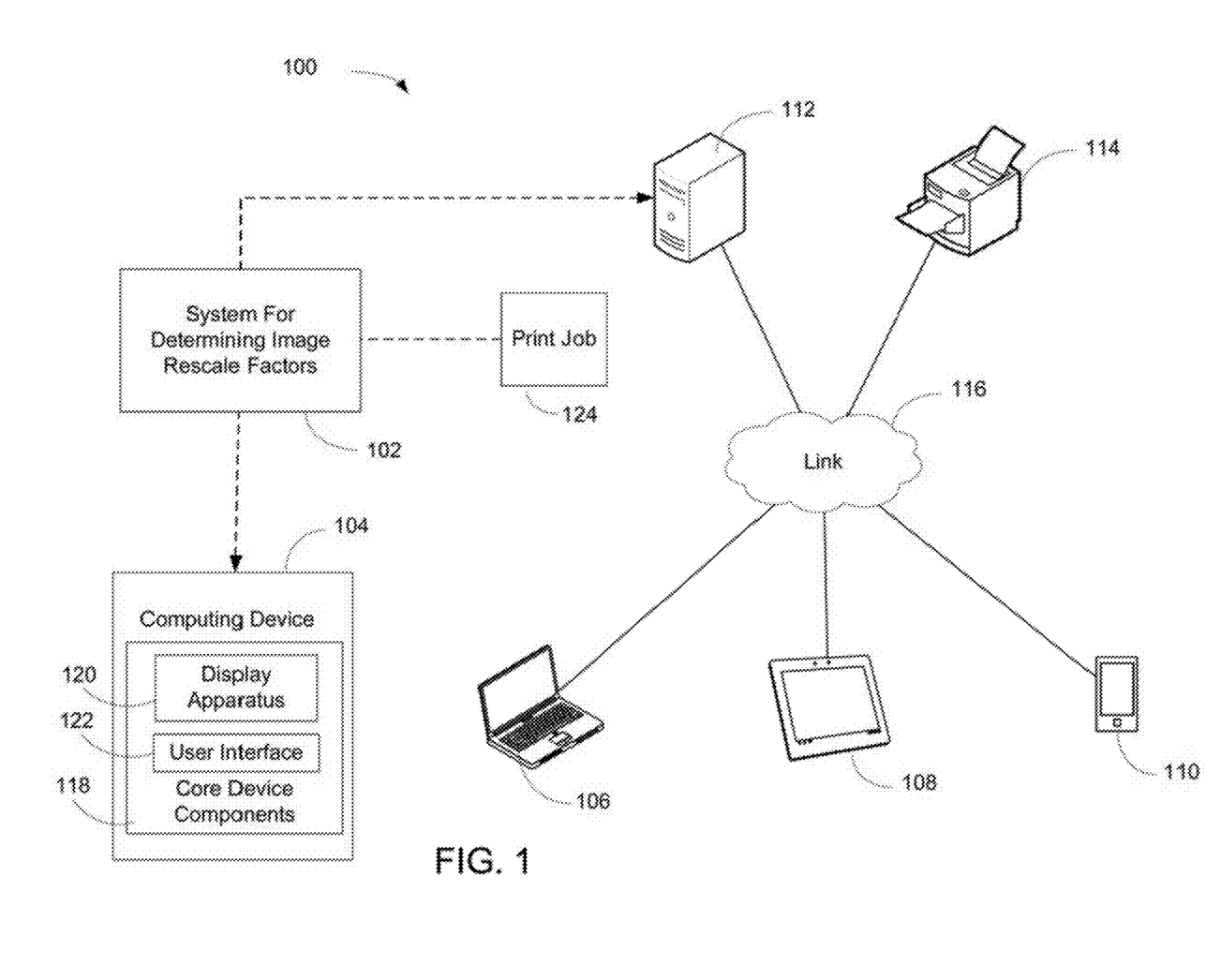
FIG. 1 is a block diagram depicting an example environment in which various embodiments may be implemented.

Environment:

FIG. 1 depicts an example environment 100 in which embodiments may be implemented as a system for determining image rescale factors 102. Environment 100 is show to include computing device 104, client devices 106, 108, and 110, server device 112, and printer 114. Components 106-414 are interconnected via link 116.

Link 116 represents generally any infrastructure or combination of infrastructures configured to enable an electronic connection, wireless connection, or other connection to enable data communication between components 104-114.

Such infrastructure or infrastructures may include, but are not limited to, one or more of a cable, wireless, fiber optic, or remote connections via telecommunication link, an infrared link, or a radio frequency link. For example, link 116 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112 and printer 114 via link 116. Server device 112 represents generally any computing device configured to serve an application and corresponding data for consumption by components 104-110 and 114.

Printer 114 represents generally any computing device configured to produce a physical printed representation of an image. Printer 114 may be a multifunction device that can perform a function such as scanning and/or copying in addition to printing. In examples, printer 114 may be a printer located in a printing system located in a commercial print provider facility. In other examples printer 114 may be a printer located in a home. In examples printer 114 may be a thermal inlet printer, a piezoelectric inkjet printer, a latex ink printer, a solid ink printer, a laser printer, or any other type of printer that ejects a colorant or colorants to form an image. Printer 114 includes hardware and programming for providing printing functions. Printer 114 may include operating system to cause the printer to interpret print data, and a printing element to cause the application of one or more colorants upon a media according to mapping provided by print data, to thereby form an image upon a media.

Computing device 104 represents generally any computing device with which a user may interact to communicate with client devices 106-110, server device 112, and/or printer 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming configured to exhibit or present a message, image, view, or other presentation for perception by a user, and can include, but is not limited to, a visual, tactile or auditory display. In examples, the display device may be or include a monitor, a touchscreen, a projection device, a touch/sensory display device, or a speaker. User interface 122 represents generally any combination of hardware and programming configured to enable interaction between a user and device 104 such that the user may effect operation or control of device 104. In examples user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming configured to enable the determining of image rescale factors. System 102 is to receive a print job 124 including instructions for printing of an image at a resolution. As used herein, a "print job" refers generally to content, e.g., an image, and/or instructions as to formatting and presentation of the content sent to a computer system for printing. In examples, a print job may be stored in a programming language and/or a numerical form so that the job can be stored and used in computing devices, servers, printers and other machines capable of performing calculations and manipulating data. As used herein, an "image" refers generally to a rendering of an object, scene, person, or abstraction such text or a geometric shape. As used herein, a "resolution" refers generally to a measure of the detail an image holds. In an example, resolution may be a pixel resolution, and may be expressed in terms of a pixel count such as "X by Y", wherein "X" is a variable representing a number greater than zero that is a number of pixel columns (width) and "Y" is a variable representing a number greater than zero that is a number of pixel rows (height). In another example, resolution may be a pixel resolution, and may be expressed in terms of a total number of pixels in the image, e.g. "Z megapixels," wherein "Z" is a variable representing a number greater than zero.

System 102 is to cause a display of the image, at the resolution, at a display device. As used herein, a "display" refers generally to an exhibition or presentation for perception by a participant. In an example, the display is or includes a graphic user interface display to be presented at a computer monitor, touchscreen, or other electronic display device. System 102 is to indicate or designate a first reference and a second reference inside the displayed image. As used herein, a "reference" refers generally to any indicated or designated feature, mark, or point within an image. In an example, the reference may designated by illuminating an element in the display. In another example, a reference may be designated by a pointer, line, ellipsis, geometric shape, or other indicator included in the display with the image.

System 102 is to determine a number of pixels in the interval that separates the designated first and second references. As used herein, a "pixel" refers generally to a discrete unit of a digitally quantized image attribute, such as brightness, luminance or color, which unit may be combined with other discrete units to construct a digital image. In examples, pixels of an image may be organized as, or classified, using a two-dimensional grid, and may be represented using dots or squares.

System 102 is to obtain a designation of real distance between the first and second references. As used herein, a "real distance" between reference points depicted in an image refers generally to a true or real distance between distinct physical features represented or signified by the reference points. In an example, the physical features may be features of a single object, e.g. distinct points in an assembled, real world door frame. In another example, the physical features may be features of unique objects, e.g. a doorframe edge and a kitchen counter edge. In an example, the real distance is a distance received by system 102 via a graphic user interface display provided by system 102. In another example, system 102 may obtain the designation of the real distance via system 102 analyzing the image and recognizing a real distance included within the image. In an example, the real distance may be included within the image as text that is visible in the display and is adjacent to the first and second references. In another example, the real distance may be included within the image as metadata.

System 102 is also to receive a desired scale for the image. As used herein, a "desired scale" refers generally to a scale for the image that was intended, anticipated or prescribed. As used herein, a "scale" of an image refers generally to proportional ratio of a linear dimension of the image to the same feature of an original item. In an example, an image may include a two-dimensional or three-dimensional scale model of a building or the scale drawings of the elevations or plans of a building. Typically the scale of an image is consistent throughout the model or drawing, and may be expressed as a ratio (e.g. 1:100), as a fraction (e.g., 1/100), or as a number (e.g. 0.01). In an example, system 102 receives the desired scale via user interaction with a graphic user interface provided by System 102.

System 102 is to determine an actual scale for the image, in consideration of the resolution, the determined number of pixels, and the real distance. As used herein, "actual scale" refers generally to a calculated or determined scale. System 102 is to then, in consideration of this determined actual scale and the desired scale, determine a rescale factor for the image. As used herein, a "rescale factor" refers generally to a number or quantity that is to be mathematically applied to change the scale of an image. In an example the resale factor is may be expressed as a percentage by which an actual or current scale is to be increased or reduced.

System 102 in turn applies the determined reseals factor to the actual scale to rescale the image to be the desired scale. In an example, system 102 is to cause revision of the print job 124 to include the rescaled image. In another example, system 102 is to cause replacement of the print job 124 with a new print job that includes the resealed image. In yet another example, system 102 is to cause printing of the rescaled image.

System 102 may be wholly integrated within core device components 118. System 102 may be implemented as a component of any of computing device 104, client devices 104-110, server device 112, printer 114, where it may take action based in part on data received from core device components 118 via link 116. System 102 may be distributed across computing device 104, and any of client devices 106-110, server device 112, or printer 114. For example, obtaining the print job, causing a display of the image, indicating or designating the first reference and second reference, determining a quantity of pixels between the first and second references, receiving a real distance, and obtaining a desired scale for the image may be performed on computing device 104, while determining a rescale factor for the image, causing revision or replacement of the print job, and causing printing of the rescaled image may be performed by printer 114. Other distributions of system 102 across computing device 104, client devices 106-110, server device 112, and printer 114 are possible and contemplated by this disclosure. It is noted that all or portions of the system for determining image rescale factors 102 may also be included on client devices 106, 108 or 110.

Figure 2:
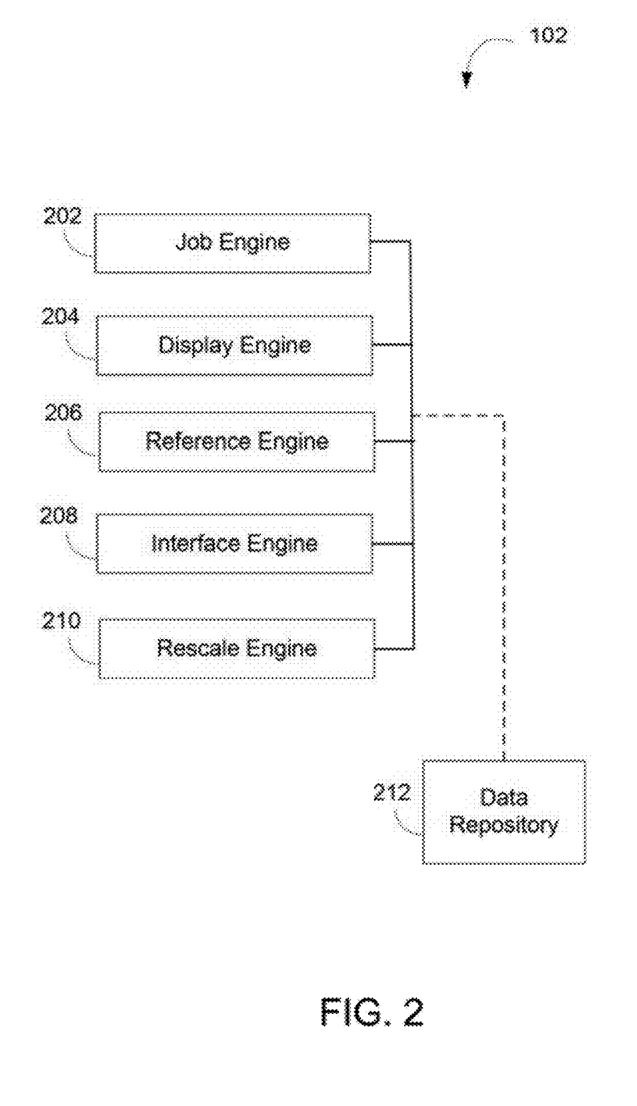
FIG. 2 is a block diagram depicting an example of a system to determine image rescale factors.
Figure 3:
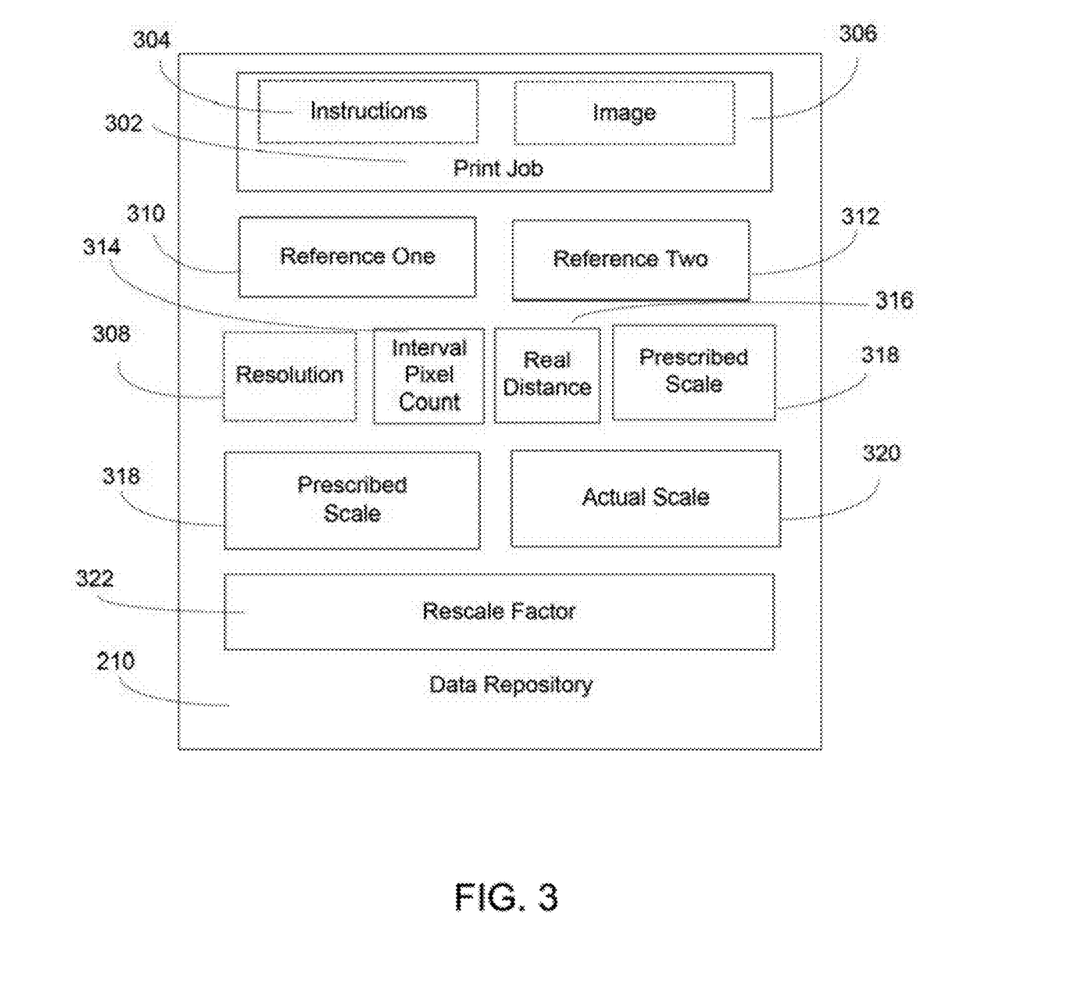
FIG. 3 is a block diagram depicting an example data structure for a system to determine image rescale factors.
Figure 4:
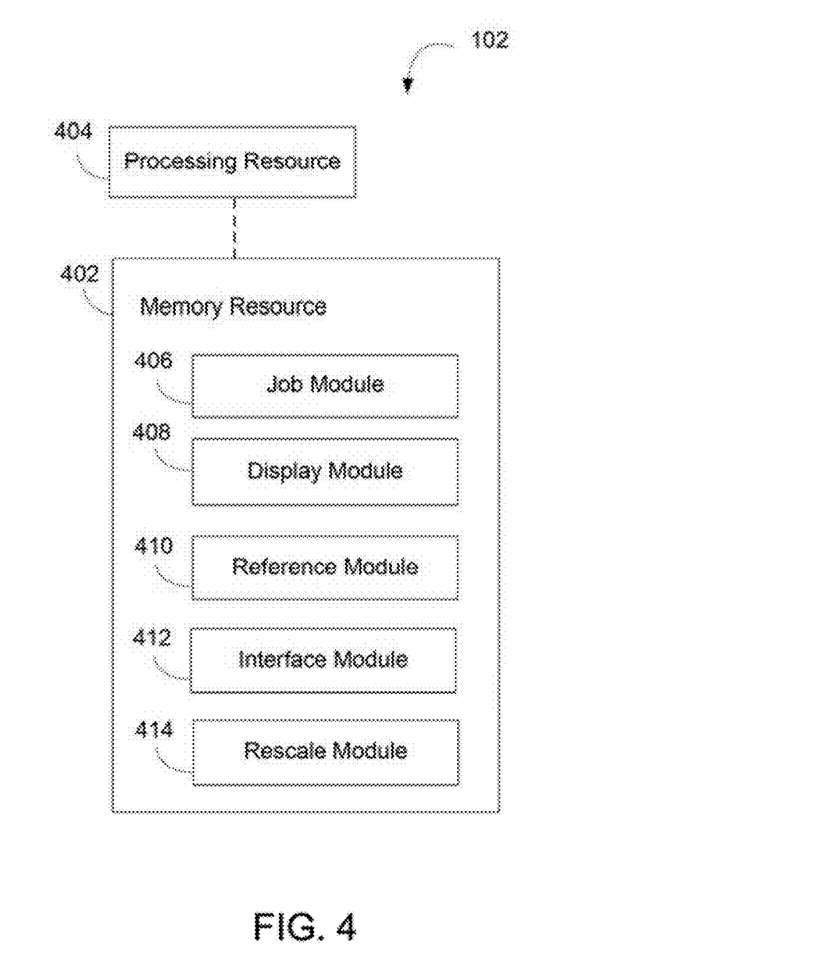
FIG. 4 is a block diagram depicting a memory resource and a processing resource according to an example.

Components:

FIGS. 2, 3, and 4 depict examples of physical and logical components for implementing various embodiments. In FIG. 2 various components are identified as engines 202, 204, 206, 208, 210. In describing engines 202, 204, 206, 208, 210, focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of system for determining image rescale factors 102. In this example, system 102 includes job engine 202, display engine 204, reference engine 206, interface engine 208, and rescale engine 210. In performing their respective functions, engines 202, 204, 206, 208, 210 may access data repository 212. Repository 212 represents generally any memory accessible to system 102 that can be used to store and retrieve data.

Job engine 202 represents a combination of hardware and programming configured to obtain a print job with instructions for printing an image at a desired or prescribed resolution. In an example, the desired resolution is a resolution included within an image document that contains the image to be printed. In an example, the resolution may be included within the image document as a resolution tag (e.g., a TIFF tag) or as other metadata within the image document. In another example, the desired resolution may be included within instructions for printing an image, wherein the instructions are in the form of data communicated separate from the image document.

Display engine 204 represents a combination of hardware and programming configured to cause a display of the image, at the desired resolution, at a display device. In an example, the display of the image at the display device is, or includes, a graphic user interface display to be presented at a computer monitor, touchscreen, projection device, touch/sensory display or other electronic display device. In an example, display engine 204 includes the display device. In another example, display engine 204 may be configured to cause the display by sending the image, along with instructions for display of the image, to a display device that is electronically or wirelessly connected to system 102.

Reference engine 206 represents a combination of hardware and programming configured to indicate a first reference and a second reference within the displayed image, and determine a quantity of pixels between the first and second references. In an example, the reference engine 206 may be configured to cause presentation of a first graphic user interface, the first interface for enabling a user to select or designate the first and second references at the display. In examples, the user selection may be via user interaction with a computer mouse (e.g. a mouseclick or hover operation), or via a finger touch upon a touchpad display, whereby a user selects two points in the displayed image to serve as the first reference and the second reference. In another example, the reference engine 206 may be configured to cause the first and second references to be indicated automatically from elements of the image, without providing an opportunity for a user to select which image elements are to serve as the first and second references.

In a particular example, reference engine 206 may be configured to cause a connecting element or bridging element to be drawn in the display between the first and second references. In an example, the connecting element may be a second graphic user interface to guide or instruct a user to provide or designate a real distance between the displayed first and second references, as discussed with respect to the interface engine below. In an example, the reference engine 206 may be configured to cause the connecting element to be drawn between the first and second references following receipt of data indicating user-selection of the image elements that are to serve as the first and second references. In a particular example, the reference engine 206 may be configured to cause provide a display of a reference-choosing tool concurrent with the display of the image. The tool may enable a user to select any two points in the displayed image as the first and second references, and then draw a connecting element between the selected first and second references. In examples, the connecting element may be in the form of a line, ellipsis, geometric shape, or any other element included in the display along with the image, for connecting the first and second references.

Interface engine represents a combination of hardware end programming configured to receive an indication of the real distance between the first and second references. In an example, the real distance is designated visibly in the displayed image, and the indication of the real distance between the first and second references may be received via a third graphic user interface following user interaction with the interface. In an example, the third graphic user interface displayed, at least for a period, concurrently with the display of the image. In examples, the third graphic user interface may include a text box, drop-down list, cycle button, slider, or any other type of graphic user interface control or widget to facilitate user interaction with the interface and system 102. In another example, interface engine 208 may be configured to obtain an indication of the real distance between the first and second references by utilizing optical character recognition or other image analysis technology to identify the real distance from a display of the image. In yet another example, interface engine 208 may be configured to obtain an indication of the real distance between the first and second references by accessing metadata within the displayed image, or within a document that includes the image.

Rescale engine 210 represents a combination of hardware and programming configured to obtain a desired scale for the image. In an example, rescale engine 210 may be configured to obtain data indicative of the desired scale from the print job itself. In an example, the desired scale is a scale included within an image document that contains the image to be printed. In an example, the desired scale may be included within the image document as a scale tag or as other metadata within the image document. In another example, the desired scale may be included within instructions for printing an image, wherein the instructions are in the form of data communicated separate from the image document.

In an example, rescale engine 210 may be configured to cause the display of a fourth graphic user interface, and to cause the desired scale to be received via the fourth graphic user interface. In an example, the fourth graphic user interface may be displayed, at least for a period, concurrently with the display of the image. In examples, the fourth graphic user interface may include a text box, drop-down list, cycle button, slider, or any other type of graphic user interface control or widget to facilitate user interaction with the interface and system 102.

In an example, rescale engine 210 may be configured to, based upon the desired resolution, the pixel quantity as determined by the reference engine 206, and the real distance received via the interface engine 208, determine an actual scale for the image. In an example, the actual scale may be determined according the following formula:

$$\text{Actual Scale} = \frac{P}{R \cdot D}$$

wherein "P", "D", and "R" are variables representing a number greater than zero, and "P"=pixel quantity between the first and second references, "R"=resolution of the image (in pixels per unit), and "D"=real distance between the first and second references.

In an example, rescale engine 210 may be configured to determine a rescale factor for the image based on the derived actual scale and the desired scale. In an example, the rescale factor scale may be determined according the following formula:

$$\text{Rescale Factor} = \frac{\text{Desired}_{scale}}{\text{Actual}_{scale}}$$

wherein "$\text{Desired}_{scale}$" is a variable representing a number greater than zero and is representative of the desired scale, and "$\text{Actual}_{scale}$" is a variable representing a number greater than zero and is representative of the derived scale.

In an example, rescale engine 210 may be configured to, upon determination of the rescale factor, apply the rescale factor to rescale the image based upon the rescale factor to adjust the image to the desired scale. In an example, rescale engine 210 may be configured to, upon determination of the rescale factor, apply the rescale factor to the derived actual scale, and thereby cause rescaling of the image to the desired scale. In an example, rescale engine 210 may be configured to cause the print job to be revised to include the resealed image. In another example, rescale engine 210 may be configured to cause the originally received print job to be replaced with a new print job that includes the rescaled image. In another example, rescale engine 210 may cause printing of the rescaled image. In a particular example, rescale engine 210 may be incorporated within a printing device, e.g., printer 114 (FIG. 1) and cause printing of the rescaled image.

FIG. 3 depicts an example implementation of data repository 212. In this example, repository 212 includes data suggestive of a print job 302, print instructions 304, an image 306, an image resolution 308, first 310 and second 312 references within the image, a number of pixels in an interval between the first and second references, a real distance 316 between the first and second references, a prescribed scale 318 for the image, a determined actual scale 320 for the image, and a determined rescale factor 322 for the image. Referring back to FIG. 2 in view of FIG. 3, in an example, job engine 202 (FIG. 2) receives a print job 302 including instructions 304 for printing of an image 306 at a prescribed resolution 308. In examples, the print job 302 may include an attached document or image file. In examples, print job engine 302 may receive the print job 302 via a print driver application, via an email application, or via another software application. In an example, the print job 302 may be received via an application executing at the same computing device that includes the job engine. In another example, print job 302 may be received via an application executing at a computing device distinct from the computing device that includes print job engine 302.

Continuing with the example of FIG. 3, display engine 204 (FIG. 2) causes presentation of the image 306, at the prescribed resolution 308, at a display device. Reference engine 206 (FIG. 2) designates a first reference 310 and a second reference 312 inside the presented image 306, and determines a number or count of pixels 314 in an interval separating the first and second references 310 312.

Continuing with the example of FIG. 3, interface engine 208 (FIG. 2) receives a designation of a real distance 316 between the first and second references 302 312. Rescale engine 210 (FIG. 2) receives a prescribed scale 318 for the image 306. Rescale engine 210 determines an actual scale 320 for the image 306 in consideration of the resolution 308, the determined number of pixels 314, and the reel distance. Rescale engine 210 in turn determines a rescale factor 322 in consideration of the actual scale 320 and the prescribed scale 318, and applies the rescale factor 322 to the determined actual scale 320 to rescale the image.

In the foregoing discussion of FIG. 2, engines 202, 204, 206, 208, 210 were described as combinations of hardware and programming. Engines 202, 204, 206, 208, 210 may be implemented in a number of fashions. Looking at FIG. 4 the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as job module 406, display module 408, reference module 410, interface module 412, and rescale module 414. Job module 406 represents program instructions that when executed may cause processing resource 404 to cause the implementation of job engine 202 of FIG. 2. Display module 408 represents program instructions that when executed cause processing resource 404 to cause the implementation of display engine 204 of FIG. 2. Reference module 410 represents program instructions that when executed may cause processing resource 404 to cause the implementation of reference engine 206 of FIG. 2. Interface module 412 represents program instructions that when executed may cause processing resource 404 to cause the implementation of interface engine 208 of FIG. 2. Rescale module 414 represents program instructions that when executed may cause processing resource 404 to cause the implementation of rescale engine 210 of FIG. 2.

Illustrative Example

Figure 5:
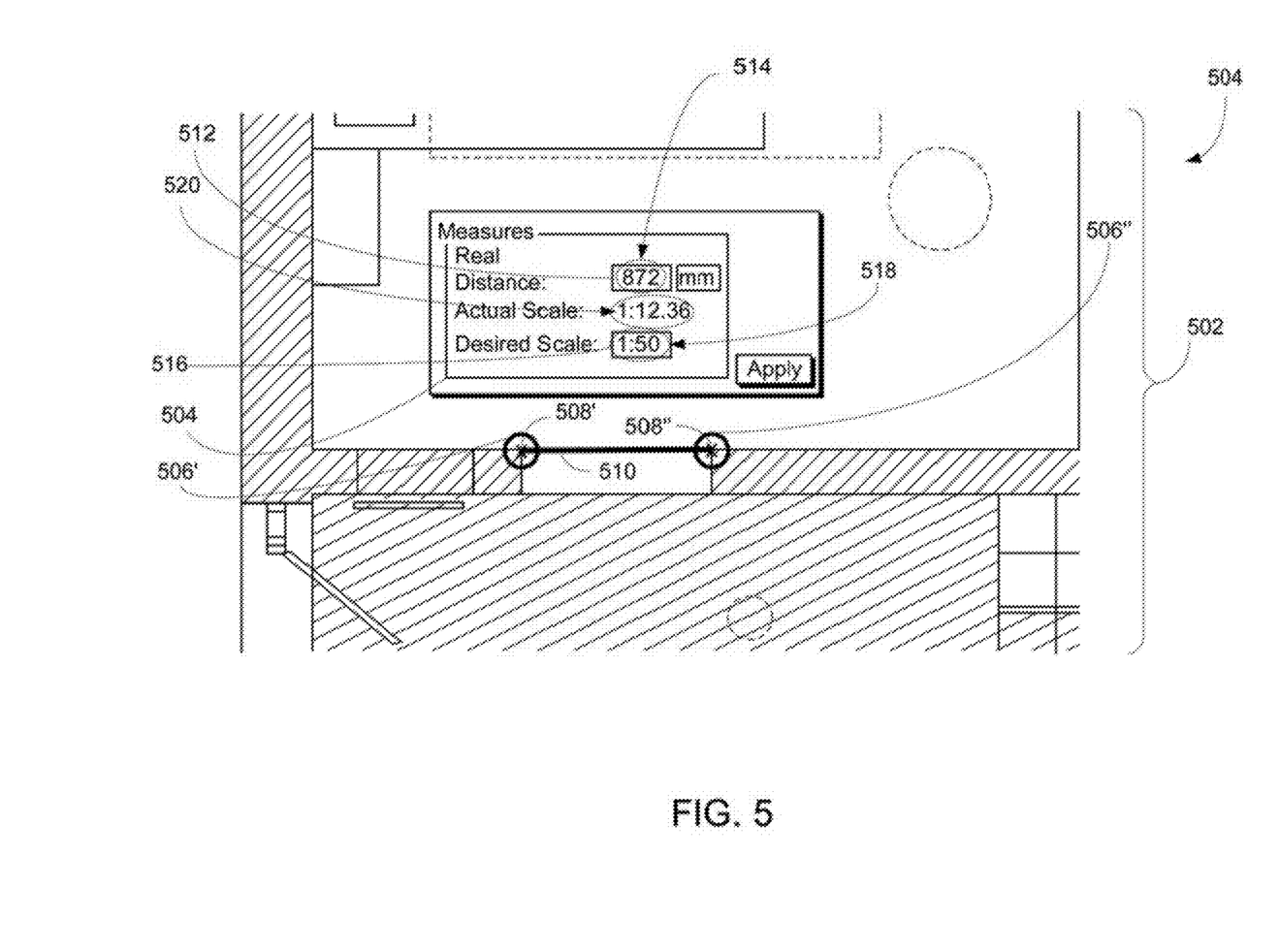
FIG. 5 illustrates an example of determining and applying an image rescale factor to a print job.
Figure 6:
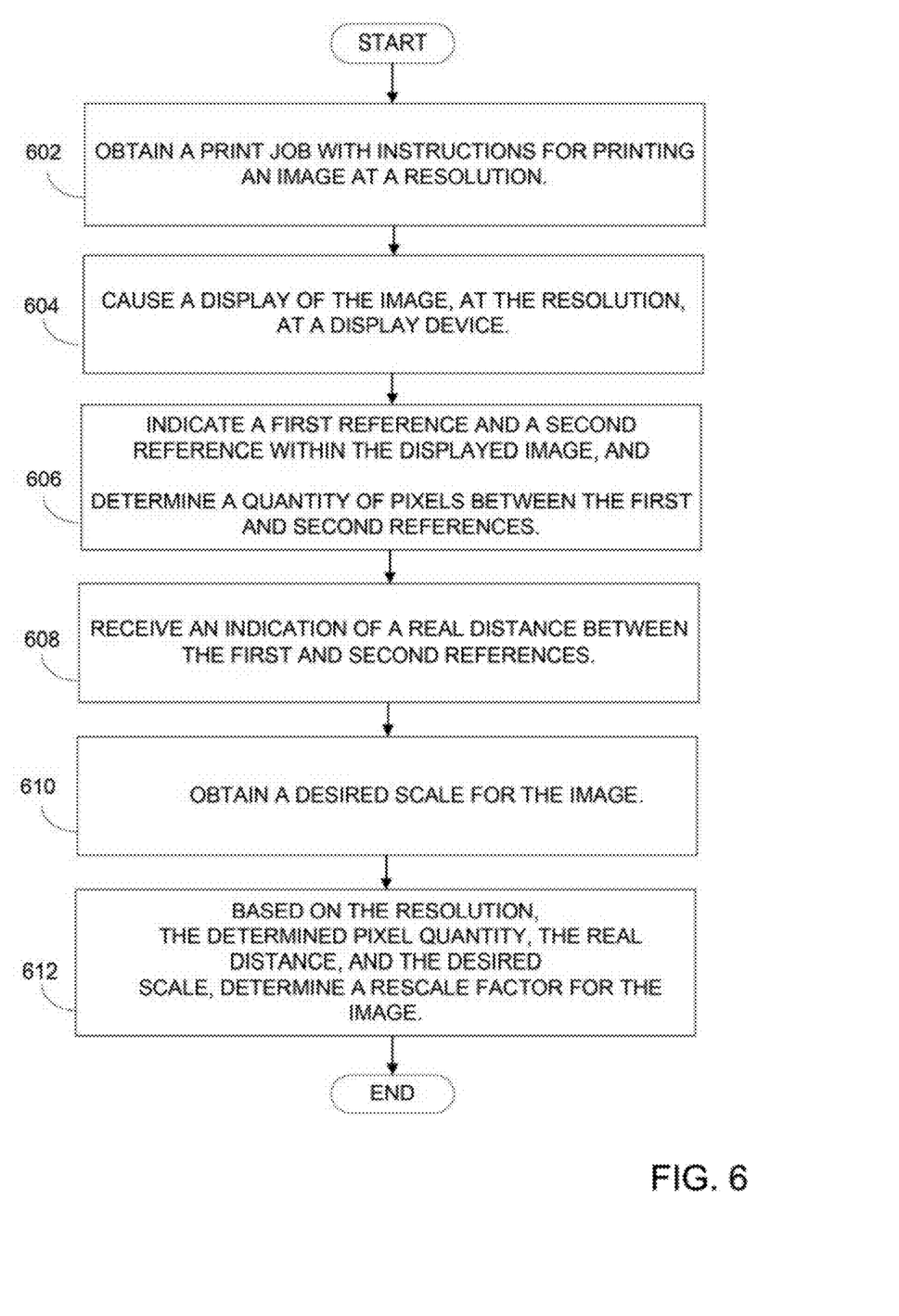
FIG. 6 is a flow diagram depicting steps taken to implement an example.

FIG. 6 illustrates an example of determining image rescale factors. Turning to FIG. 5, in view of FIG. 2, system 102 (FIG. 2) receives a print job with instructions for printing an architectural plan image 502 at a desired or prescribed resolution of 2.83 pixels/mm. In this example, the prescribed resolution is a resolution included as metadata within an image document that includes the image 502 to be printed.

System 102 causes a graphic user interface display 504 of the image 502, at the prescribed resolution, at a computer's display device, e.g., a computer monitor touchscreen. In this example, system 102 causes the display by sending the image 502, along with instructions for display of the image, to a display device that is electronically or wirelessly connected to system 102.

System 102 causes display of graphic user interface reference selection tools 506' 506", the tools for enabling a user to select or designate a first reference 508' and a second reference 508" within the display 504. In this example, each reference selection tool includes a circle with an "X" enclosed within, the first tool 506' to select the first reference 508' and a second tool 506" to select the second reference 508". In this example, user selection of the first and second references 508' 508" occurs via user interaction with a computer mouse (e.g. a mouseclick or hover operation). The use selects two points in the displayed image to serve as the first reference 508" and the second reference 508".

In this example, system 102 causes a graphic user interface bridging element in the form of a bridging line 510 to be drawn in the display 504 between the first and second references 508' 508", concurrent with the display of the image 504. In this example, the bridging line 510 is to guide a user in determining a real distance between the displayed first and second references 508' 508". In this example, system 102 causes the bridging line 510 to be drawn between the first and second references 508' 508" following receipt of data at system 102 indicating user-selection of image elements that are to serve as the first and second references 508' 508". After indication of the first and second references 508' 508", system 102 causes counting of or otherwise determines that a quantity of 200 pixels exists between the first and second references 508' 508". In an example, the counting or determination of the quantity of pixels may be based upon pixels included within the bridge line.

System 102 causes presentation within display 504 at the display device of a first text box graphic user interface 512 for enabling a user to provide the indication of the real distance between the first and second references 508' 508". The first text box 512 is displayed, at least for a period, concurrently with the display of the image 304. System 102 receives, as the result of user-input at the text box 512, an indication of a 872 mm real distance 514 between the first and second references 508' 508".

Continuing with the example of FIG. 5, system 102 obtains a 1:50 prescribed scale 518 for the image. In this example, system 102 causes presentation within the display 504 at the display device of a second text box graphic user interface 516 for enabling a user to provide the 1:50 prescribed scale 518, and receives the prescribed scale 518 via user input at the second text box interface 516. The second text box interface 516 is displayed, at least for a period, concurrently with the display of the image 502.

System 102, based upon the prescribed resolution, the determined pixel quantity, and the received real distance 514, determines an actual scale for the image. In this example, the actual scale may be determined according the following formula:

$$\text{Actual Scale} = \frac{P}{R \cdot D}$$

wherein "P"=pixel quantity between the first and second references, "R,"=resolution of the image (in pixels per unit), and "D"=real distance between the first and second references. In this example, an actual scale of 0.0809 is determined as follows:

$$\text{Actual Scale of } 0.0809 \text{ or } 1{:}12.36 = \frac{200 \text{ pixels}}{2.83 \text{ pixels/mm} \cdot 872 \text{ mm}}$$

In this example, system 102 causes the determined actual scale 520 to be displayed concurrent with the display 504 of the image to be printed.

Continuing with the example of FIG. 5, system 102 determines a 0.2474 rescale factor for the image based on the derived 1:12.36 actual scale 520 and the 1:50 prescribed scale 518. In an example, the rescale factor scale may be determined according the following formula:

$$\text{Rescale Factor} = \frac{\text{Prescribed}_{scale}}{\text{Actual}_{scale}}$$

wherein "Prescribed$_{scale}$" is representative of the prescribed scale 518, and "Actual$_{scale}$" is representative of the derived actual scale 520. In this example, a rescale factor of 0.2474 is determined as follows:

$$\text{Rescale Factor of } 0.2474 = \frac{\left(\frac{1}{50}\right)}{\left(\frac{1}{12.36}\right)}$$

Continuing with the example of FIG. 5, system 102, upon determination of the rescale factor, applies the 0.2474 rescale factor to the derived 1:12.36 (or 0.809) actual scale of the image, and thereby adjusts the actual scale of the image 502 to the prescribed scale. In this example, system 102 applies the 0.2474 rescale factor to adjust the actual scale by causing printing of the image 502 at 0.2474 (or 24.74 percent) of the actual scale. In this example, system 102 causes the print job to be revised to include the resealed image, and causes printing of the resealed image.

Operation:

FIG. 6 is a flow diagram of steps taken to implement a method for determining image rescale factors. In discussing FIG. 6, reference may be made to the components depicted in FIGS. 2 and 4. Such reference is made to provide contextual examples and not to limit the manner in which the method depicted by FIG. 6 may be implemented. A print job, with instructions for printing an image at a resolution, is obtained (block 602). Referring back to FIGS. 2 and 4, job engine 202 (FIG. 2) or job module 406 (FIG. 4), when executed by processing resource 404, may be responsible for implementing block 602.

A display of the image at the resolution at a display device is caused (block 604). Referring back to FIGS. 2 and 4, display engine 204 (FIG. 2) or display module 408 (FIG. 4), when executed by processing resource 404, may be responsible for implementing block 604.

A first reference and a second reference within the displayed image are indicated, and a quantity of pixels between the first and second references is determined (block 606). Referring back to FIGS. 2 and 4, reference engine 206 (FIG. 2) or reference module 410 (FIG. 4), when executed by processing resource 404, may be responsible for implementing block 606.

An indication of a real distance between the first and second references is received (block 608). Referring back to FIGS. 2 and 4, interface engine 208 (FIG. 2) or interface module 412 (FIG. 4), when executed by processing resource 404, may be responsible for implementing block 608.

A desired scale for the image is obtained (block 610). Referring back to FIGS. 2 and 4, rescale engine 208 (FIG. 2) or rescale module 414 (FIG. 4), when executed by processing resource 404, may be responsible for implementing block 610.

A rescale factor for the image is determined based on the resolution, the determined pixel quantity, the real distance, and the desired scale (block 612). Referring back to FIGS. 2 and 4, rescale engine 208 (FIG. 2) or rescale module 414 (FIG. 4), when executed by processing resource 404, may be responsible for implementing block 612.

CONCLUSION

FIGS. 1-6 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarity that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 show a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A non-transitory memory resource having executable instructions stored thereon, wherein the instructions instruct a processing resource to:
    obtain a print job with instructions for printing an image at a pixel resolution;
    cause a display of the image, at the pixel resolution, at a display device;
    designate a first reference feature and a second reference feature within the displayed image;
    count a quantity of pixels separating the first and second reference features;
    receive an indication of a numerical real distance between the first and second reference features; and
    obtain a desired scale for the image, and based on the pixel resolution, the determined pixel quantity, the real distance, and the desired scale, determine a rescale factor for the image.

2. The memory resource of claim 1, wherein the instructions to determine the rescale factor further instruct the processing resource to:
    determine an actual scale for the image based on the pixel resolution, the pixel quantity, and the real distance,
    wherein the determined rescale factor is equivalent to a quotient of the desired scale divided by the actual scale.

3. The memory resource of claim 2, wherein the instructions further instruct the processing resource to rescale the image based upon the rescale factor so as to adjust the image to the desired scale.

4. The memory resource of claim 1, wherein the instructions further instruct the processing resource to
    cause revision of the print job to include the rescaled image, or
    cause replacement of the print job with a new print job that includes the rescaled image.

5. The memory resource of claim 1, wherein the instructions further instruct the processing resource to cause printing of the rescaled image.

6. The memory resource of claim 1, wherein the instructions further instruct the processing resource to receive selections of the first and second references via a displayed graphic user interface.

7. The memory resource of claim 1, wherein the instructions further instruct the processing resource to cause a connecting element to be drawn in the display between the first and second references.

8. The memory resource of claim 1, wherein the instructions further instruct the processing resource to receive the indication via a displayed graphic user interface.

9. The memory resource of claim 8, wherein the interface is caused, at least for a period, to be displayed concurrently with the display of the image.

10. A system to rescale an image to be printed, comprising:
    a processing resource; and
    a non-transitory machine-readable storage medium coupled to the processing resource and comprising instructions executable by the processing resource to
    receive a print job including instructions for printing of an image at a pixel resolution;
    cause a presentation of the image, at the pixel resolution, at a display device;
    designate a first reference feature and a second reference feature inside the presented image;
    determine a number of pixels in an interval separating the first and second reference features;
    receive a numerical designation of a real distance between the first and second reference features;
    receive a desired scale for the image;
    in consideration of the pixel resolution, the determined number of pixels, and the real distance, determine an actual scale for the image; and
    in consideration of the actual scale and the desired scale, determine a rescale factor and apply the factor to rescale the image to the desired scale.

11. The system of claim 10, wherein the system comprises a printing device and wherein the instructions further instruct the processing resource to cause printing of the resealed image on the printing device.

12. The system of claim 10, wherein the instructions further instruct the processing resource to receive the desired scale via a displayed graphic user interface.

13. The system of claim 12, wherein the instructions further instruct the processing resource to receive designations of the first and second references via a displayed graphic user interface.

14. The system of claim 10, wherein the instructions further instruct the processing resource to obtain data indicative of the real distance or the desired scale from the print job.

15. A method to rescale an image to be printed, comprising:
    obtaining a print job with instructions for printing an image at a pixel resolution;
    causing a display of the image, at the pixel resolution, at a display device;
    receiving a selection of first and second references within the image via a displayed graphic user interface;
    in response to the selection, displaying a bridging element between the selected first and second references;
    determining a number of pixels between the first and second references;
    receive a numerical value of real distance between the first and second references via a displayed graphic user interface;
    receiving the desired scale via a displayed graphic user interface;
    determining an actual scale for the image based on the pixel resolution, the pixel number, and the real distance;
    determining a rescale factor for the image by dividing the desired scale by the actual scale; and
    adjusting the actual scale of the image by the rescale factor, to rescale the image from the actual scale to the desired scale.

16. The memory resource of claim 1, wherein the reference module is further to display a bridging element between the first and second reference features.

17. The memory resource of claim 1, wherein each of the first and the second reference features corresponds to a distinct real-world physical feature depicted in the image, and wherein the real distance is a numerical value of a physical distance between the real-world physical features corresponding to the first and the second reference features.

18. The memory resource of claim 1, wherein a print of the image on an intended size medium, after rescaling of the image according to the rescale factor, is usable to calculate a real-world distance between two features depicted on the print by measuring a distance on the print between the two features and multiplying the measured distance by the desired scale.

* * * * *

UNITED STATES PATENT AND TRADEMARK OFFICE
CERTIFICATE OF CORRECTION

PATENT NO. : 10,313,558 B2  
APPLICATION NO. : 15/105285  
DATED : June 4, 2019  
INVENTOR(S) : Jordi Arnabat Benedicto et al.

Page 1 of 1

It is certified that error appears in the above-identified patent and that said Letters Patent is hereby corrected as shown below:

In the Claims

In Column 14, Line 20, Claim 11, after "device" insert -- , --.

In Column 14, Line 22, Claim 11, delete "resealed" and insert -- rescaled --, therefor.

Signed and Sealed this  
Third Day of December, 2019

Andrei Iancu  
*Director of the United States Patent and Trademark Office*